(12) United States Patent
Wu et al.

(10) Patent No.: US 7,233,121 B2
(45) Date of Patent: Jun. 19, 2007

(54) FAN SPEED CONTROL CIRCUIT

(75) Inventors: Chia-Feng Wu, Taoyuan Hsien (TW); Yueh-Lung Huang, Taoyuan Hsien (TW); Ming-Shi Tsai, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/270,494

(22) Filed: Nov. 10, 2005

(65) Prior Publication Data

US 2006/0056823 A1 Mar. 16, 2006

Related U.S. Application Data

(63) Continuation-in-part of application No. 10/839,818, filed on May 6, 2004.

(30) Foreign Application Priority Data

Jul. 4, 2003 (TW) .................. 92118358 A
Aug. 12, 2005 (TW) .................. 94127413 A (51) Int. Cl.
*H02P 25/12* (2006.01)

(52) U.S. Cl. ............. 318/439; 318/254; 318/434

(58) Field of Classification Search ........... 318/245, 318/254, 280–294, 439, 599, 268, 727
See application file for complete search history.

(56) References Cited

U.S. PATENT DOCUMENTS

| | | | |
|---|---|---|---|
| 5,099,408 A * | 3/1992 | Chen et al. ............ 363/41 |
| 5,513,361 A * | 4/1996 | Young ............... 713/320 |
| 5,825,642 A * | 10/1998 | Ishii et al. ........... 363/141 |
| 5,848,282 A * | 12/1998 | Kang ............... 713/323 |
| 5,869,946 A * | 2/1999 | Carobolante ............ 318/811 |
| 5,952,798 A * | 9/1999 | Jones et al. ............ 318/268 |
| 6,008,603 A * | 12/1999 | Jones et al. ............ 318/254 |
| 6,054,823 A * | 4/2000 | Collings et al. ........... 318/439 |
| 6,392,372 B1 * | 5/2002 | Mays, II ............ 318/254 |
| 6,545,438 B1 * | 4/2003 | Mays, II ............ 318/254 |
| 6,563,284 B2 * | 5/2003 | Teutsch et al. ........... 318/599 |
| 6,650,074 B1 * | 11/2003 | Vyssotski et al. ........ 318/254 |
| 6,690,135 B2 * | 2/2004 | Mir et al. ............. 318/599 |
| 6,700,339 B2 * | 3/2004 | Vyssotski et al. ........ 318/254 |
| 6,703,803 B2 * | 3/2004 | Ohiwa et al. ............ 318/138 |
| 6,806,673 B2 * | 10/2004 | Ho ................. 318/599 |

(Continued)

*Primary Examiner*—Paul Ip
(74) *Attorney, Agent, or Firm*—Birch, Stewart, Kolasch & Birch, LLP (57) ABSTRACT

A fan speed control circuit includes a pulse width modulation (PWM) signal generating circuit, a driving circuit and a phase compensation unit. The PWM signal generating circuit generates a PWM control signal with a sequence of alternating on-time and off-time, and the driving circuit outputs a driving signal according to the PWM control signal to a fan motor. The phase compensation unit is connected to the fan motor for delaying or advancing the PWM control signal by a phase angle to synchronize the acting period of the back electromotive force formed by the magnetic flux variation with the off-time of the PWM control signal. The present invention further provides a bi-power motor driving system including a motor rotating by receiving a first power from a first power generator, and a driving circuit for driving the motor according to a second power from a second power generator.

14 Claims, 11 Drawing Sheets

U.S. PATENT DOCUMENTS

| | | | |
|---|---|---|---|
| 6,815,916 B2* | 11/2004 | Horng et al. | 318/138 |
| 6,850,031 B2* | 2/2005 | Nakata et al. | 318/801 |
| 6,965,208 B2* | 11/2005 | Chen | 318/490 |
| 6,979,964 B1* | 12/2005 | Roe | 318/139 |
| 6,995,534 B2* | 2/2006 | Berroth et al. | 318/434 |
| 7,030,584 B1* | 4/2006 | Alberkrack | 318/439 |
| 2002/0060544 A1* | 5/2002 | Teutsch et al. | 318/599 |
| 2002/0149342 A1* | 10/2002 | Nakata et al. | 318/801 |
| 2003/0155886 A1* | 8/2003 | Ohiwa et al. | 318/727 |
| 2003/0198464 A1* | 10/2003 | Horng et al. | 388/831 |
| 2003/0222608 A1* | 12/2003 | Vyssotski et al. | 318/254 |
| 2004/0056617 A1* | 3/2004 | Berroth et al. | 318/439 |
| 2005/0002657 A1 | 1/2005 | Martin | |
| 2005/0047761 A1* | 3/2005 | Babb et al. | 388/805 |
| 2005/0077849 A1* | 4/2005 | Chen | 318/268 |
| 2005/0257546 A1* | 11/2005 | Ishishita | 62/236 |
| 2006/0097677 A1* | 5/2006 | Brannen et al. | 318/439 |
| 2006/0097678 A1* | 5/2006 | Alberkrack et al. | 318/439 |

* cited by examiner

FAN SPEED CONTROL CIRCUIT

CROSS-REFERENCE TO RELATED APPLICATIONS

This application is a continuation-in-part of U.S. application Ser. No. 10/839,818 filed May 6, 2004, which claims priority to Taiwan application Serial Number 92118358 filed Jul. 4, 2003, currently pending. The present application is also based on, and claims priority from Taiwan Application Serial Number 94127413 filed Aug. 12, 2005. All of these applications are incorporated herein by this reference.

BACKGROUND OF THE INVENTION (a) Field of the Invention

The present invention relates to a fan speed control circuit and, more particularly, to a fan speed control circuit capable of reducing vibrations and noises in a fan motor by using a phase control method.

(b) Description of the Related Art

Among conventional fan speed control technologies, pulse width modulation (PWM) control is the most common method used to control the speed of direct current (DC) motors.

Figure 1:
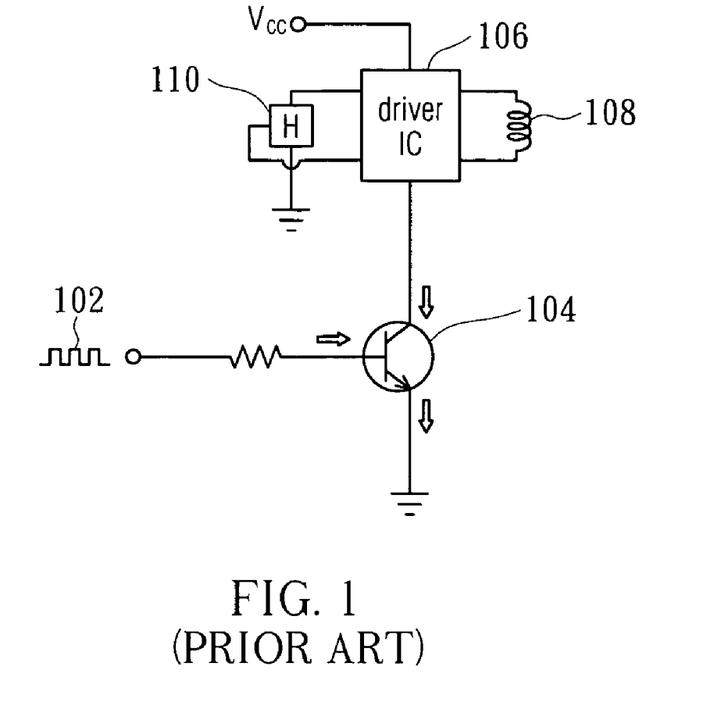
FIG. 1 is a schematic diagram illustrating a conventional PWM fan speed control circuit.

Referring to FIG. 1, in a conventional PWM control method, an external PWM signal 102 is used to drive a bipolar transistor 104 and a driver IC 106 such that the terminal voltage of a stator coil 108 is controlled. Also, a hall element 110 whose output voltage is directly proportional to the magnetic field strength is used to sense the magnetic polarity of the rotor in a fan motor.

Figure 2:
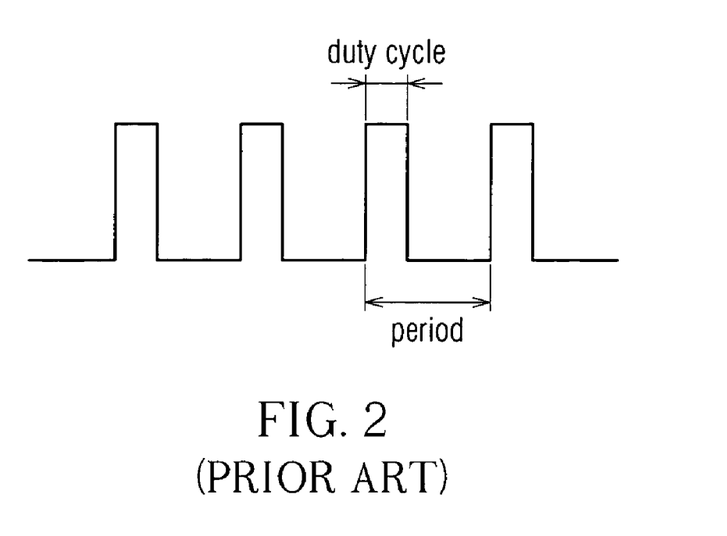
FIG. 2 is a schematic diagram illustrating a sequence of alternating on-time and off-time for a PWM control signal.

Referring to FIG. 2, the fan motor is "on-time" as the pulse level of the incoming PWM signal 102 is high (also called the duty cycle), while the fan motor is "off-time" as the pulse level is low. The sum of these two times is one period. Therefore, one can, for instance, decrease the on-time or increase the off-time of the fan motor in one period to lower the motor speed.

In a brushless DC motor, cogging torque is produced by the magnetic attraction between the rotor mounted on permanent magnets and the stator, and it is an undesired effect that makes precise positioning of the rotor impossible because the rotor tends to lock onto the position where it is aligned with the stator poles. Further, when the rotor rotates, the magnetic flux variation causes back electromotive force (back emf) effect, and the back emf effect in turn enhances the cogging torque to result in high values of output ripple, vibrations, and noises in the fan motor.

Figure 3A:
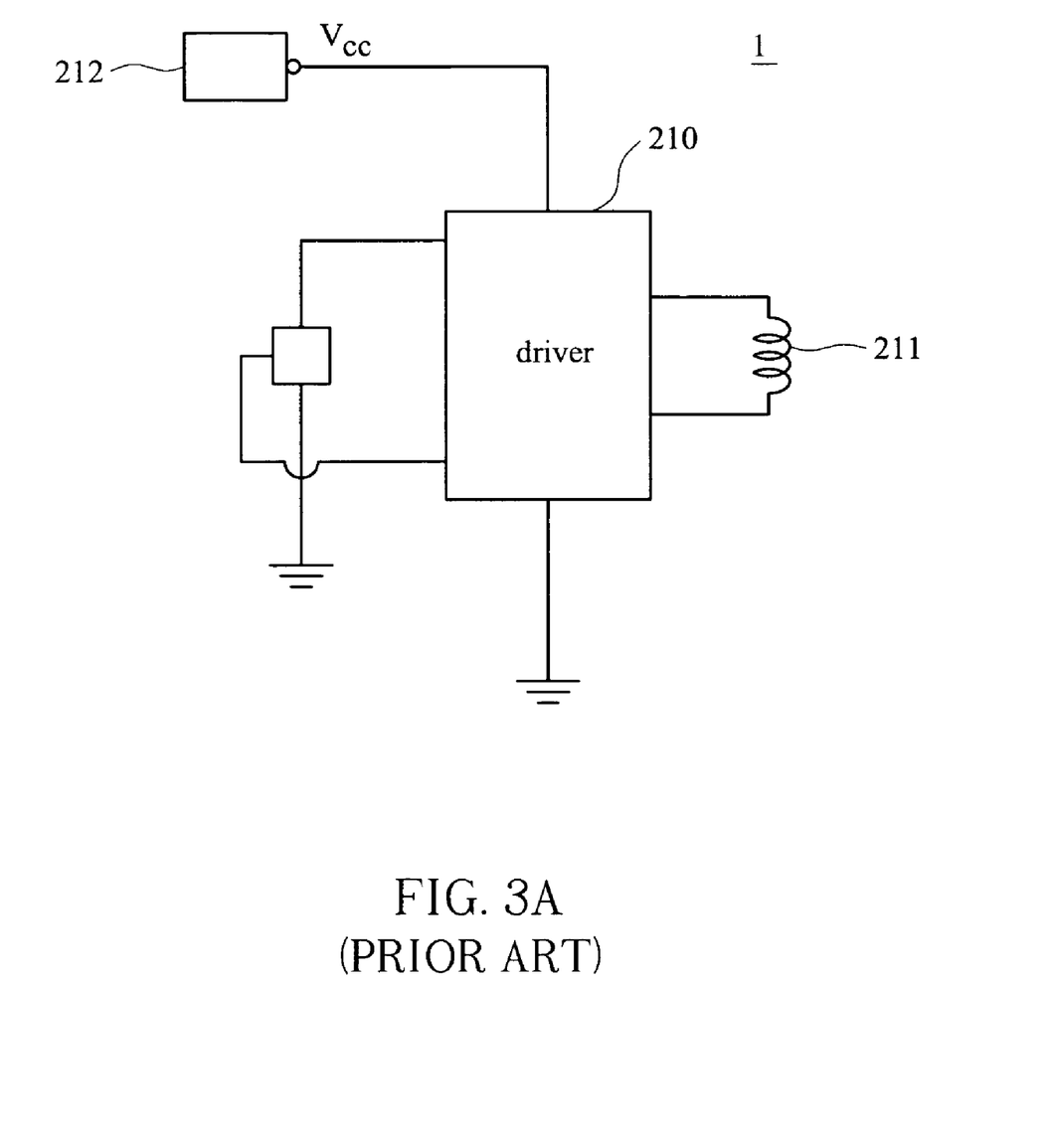
FIG. 3A is a schematic diagram illustrating a first type of conventional motor driving system.

FIG. 3A shows a conventional motor driving system 1 mainly consisting of a driver 210 and a coil 211 wherein the coil 211 is electrically connected with the driver 210, and the driver 210 is electrically connected with a power generator 212 and receives a power Vcc from the power generator. The power Vcc provides the driver 210 with the necessary working voltage and the driver 210 outputs a driving current to the coil 211 based on the working voltage.

Figure 3B:
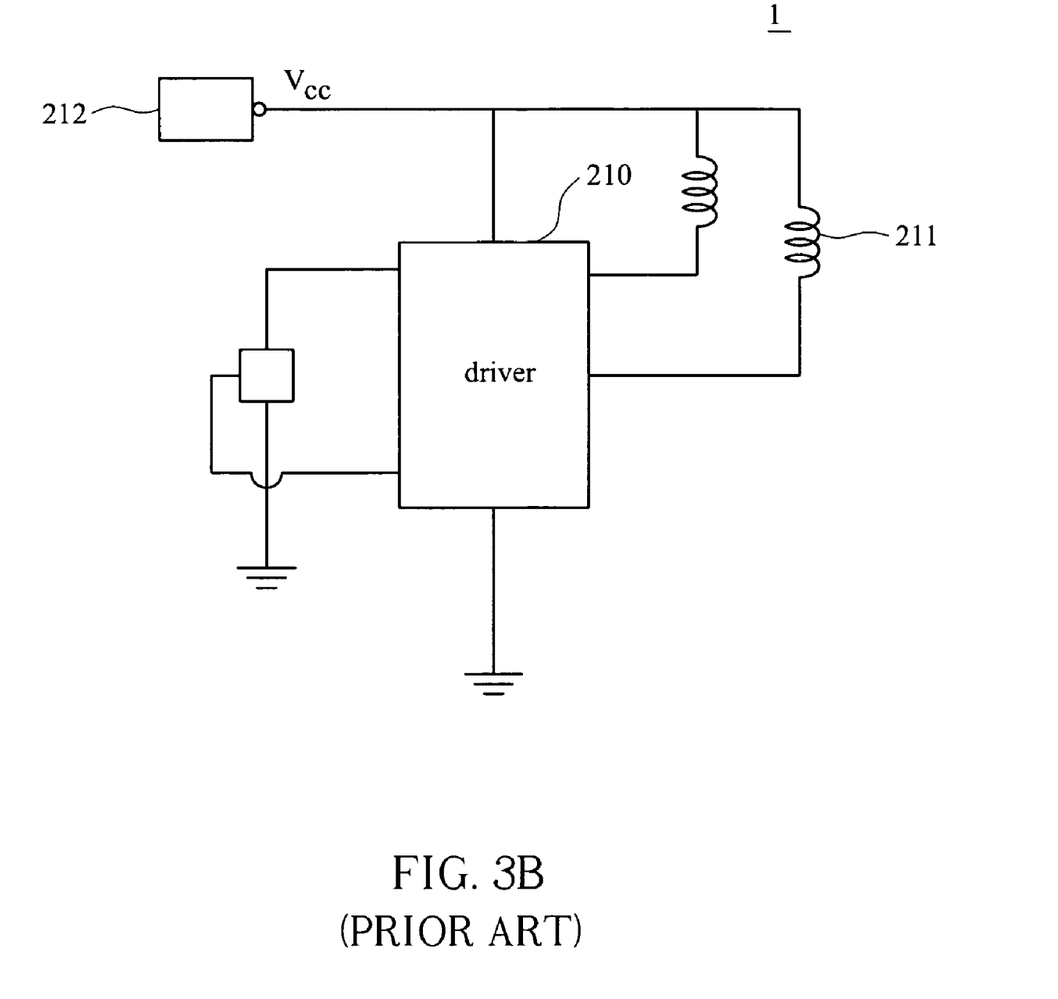
FIG. 3B is a schematic diagram illustrating a second type of conventional motor driving system.

FIG. 3B shows another conventional motor driving system 1 differing from the aforementioned motor driving system 1 in that the driver 210 is electrically connected with a plurality of coils 211 (only two coils are shown in FIG. 3B).

In these two kinds of motor driving systems 1 mentioned above, the motor speed is controlled by varying the power Vcc. However, such kind of speed control technique is limited by the working voltage of the driver 210 thereby resulting in a narrow speed-control range, and therefore cannot satisfy the industry requirement, gradually.

Figure 4A:
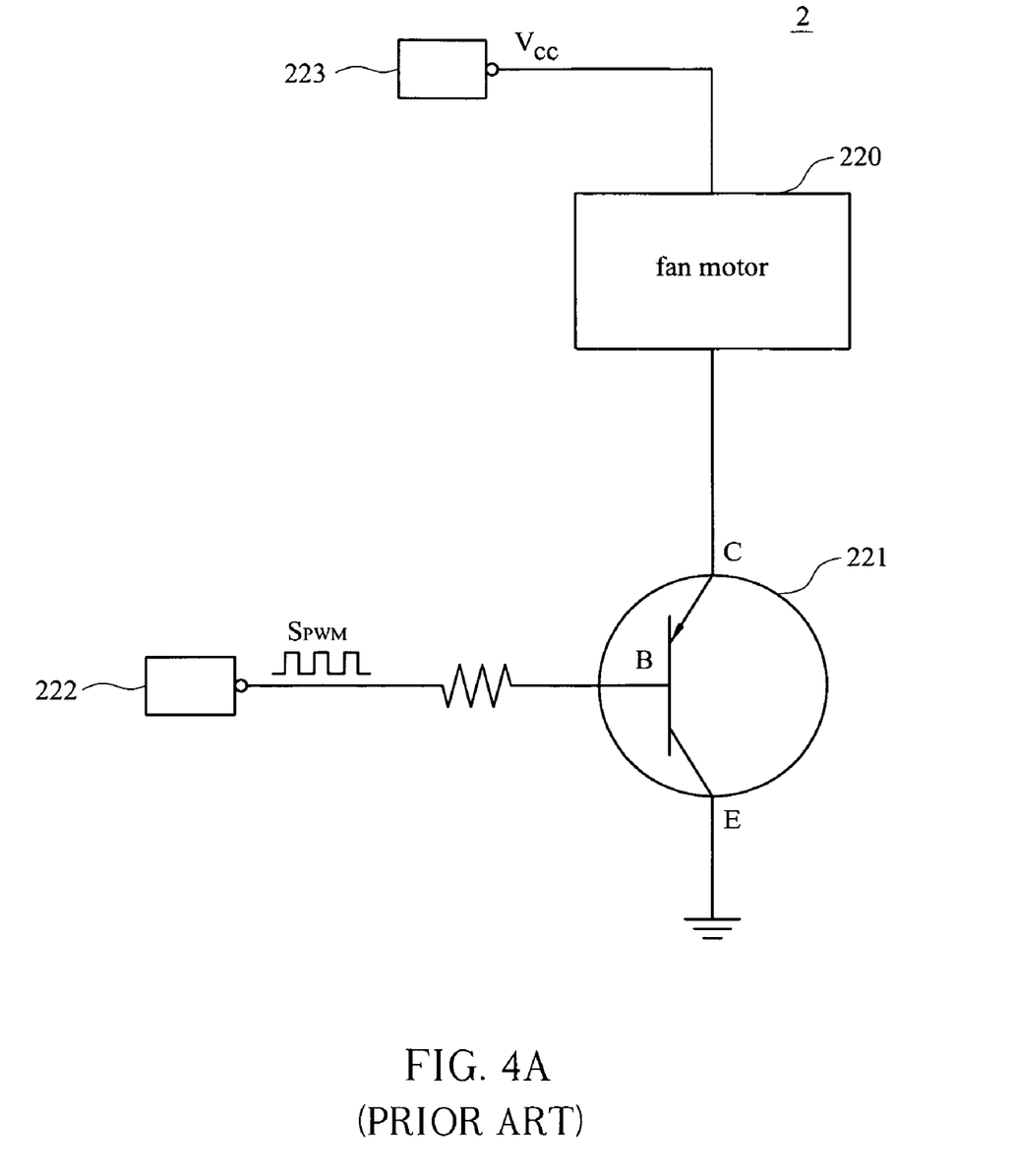
FIG. 4A is a schematic diagram illustrating a third type of conventional motor driving system.
Figure 4B:
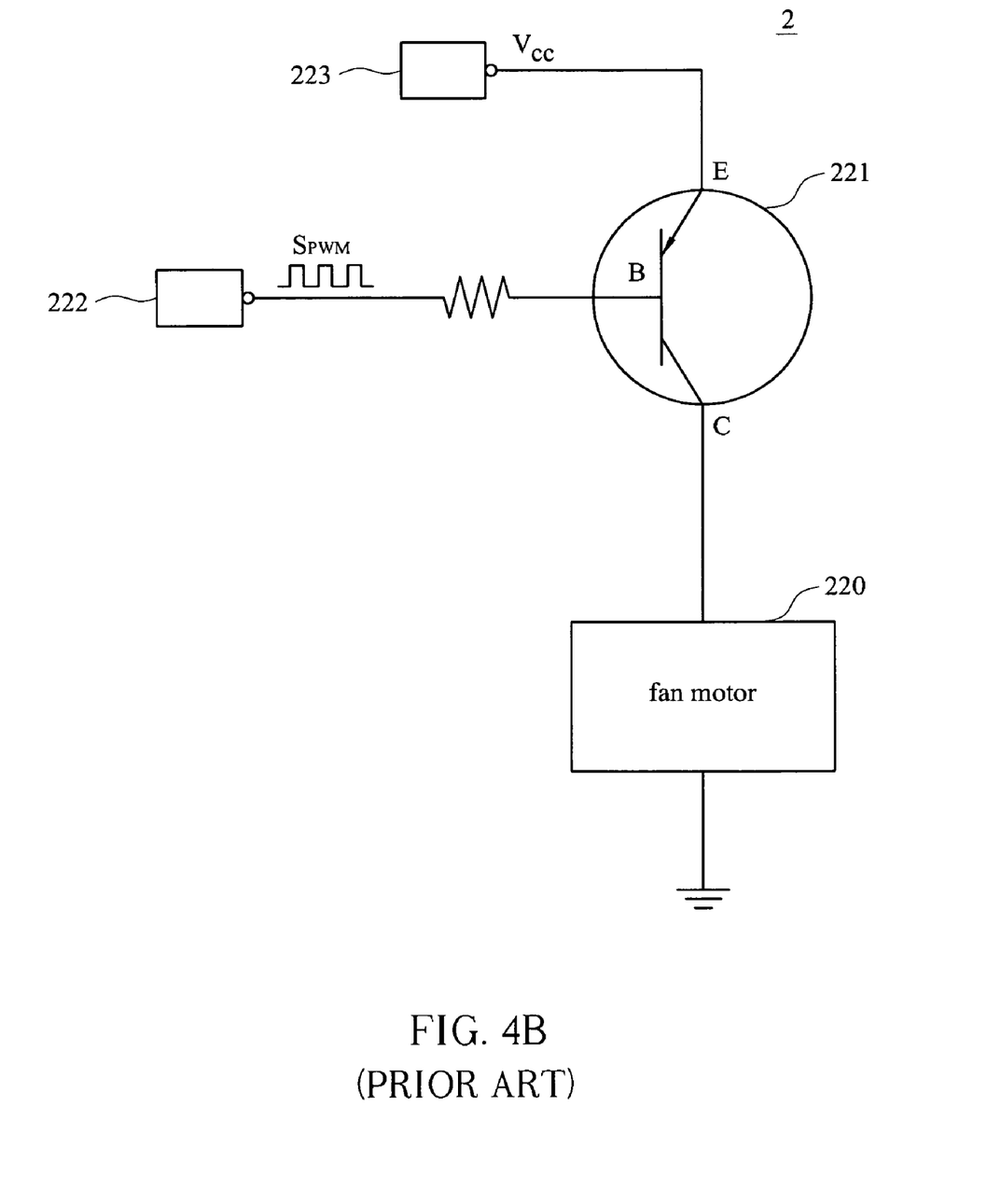
FIG. 4B is a schematic diagram illustrating a fourth type of conventional motor driving system.

FIG. 4A and FIG. 4B show a conventional motor driving system 2 wherein the driver 210 and the coil 211 of FIG. 3A and FIG. 3B are applied as a fan motor 220. The fan motor 220 of FIG. 4A has one end electrically connected with a power generator 223 for receiving a power Vcc from the power generator and the other end electrically connected with a collector C of a transistor 221. The transistor 221 has an emitter E electrically connected with a ground terminal and a base B electrically connected with a PWM signal source 222. The motor driving system of FIG. 4B differs from that of FIG. 4A mainly in that the fan motor 220 has one end electrically connected with a ground terminal and the other end electrically connected with the collector of the transistor 221, and the emitter E of the transistor 220 is electrically connected with the power generator 223. In the motor driving systems 2 shown in FIG. 4A and FIG. 4B, the base B of the transistor 220 receives a PWM signal (Spwm) from the PWM source 222, and the transistor 221 is turned on or off according to the PWM signal thereby controlling the speed of the fan motor 220. In this kind of control method, the speed modulation of the fan motor 220 is achieved by performing the ON/OFF action. However, the driver (not shown) in the fan motor 220 also performs switching action while the ON/OFF action is performed, thereby producing on/off switching noise which in turn causes electric noise. Therefore, it is not a good design and needs to be improved.

BRIEF SUMMARY OF THE INVENTION

An object of the invention is to provide a phase control method of a PWM fan speed control circuit for effectively reducing vibrations and noises in a fan motor.

According to the design of the invention, a fan speed control circuit includes a PWM signal generating circuit, a driving circuit and a phase compensation unit. The PWM signal generating circuit generates a PWM control signal with a sequence of alternating on-time and off-time, and the driving circuit outputs a driving signal according to the PWM control signal to the fan motor. The phase compensation unit is connected to the fan motor for delaying or advancing the PWM control signal by a phase angle to synchronize the acting period of the back electromotive force formed by the magnetic flux variation with the off-time of the PWM control signal.

Through the design of the invention, since the PWM control signal can be delayed or advanced by a phase angle, the off-time of the PWM control signal can be set to synchronize with the acting period of the back electromotive force formed by the magnetic flux variation. Thus, the abrupt changes of the current waveform are cut off to smooth the rotation of the rotor, and vibrations and noises in the fan motor are considerably reduced as a result.

The present invention further provides a bi-power motor driving apparatus in order to solve the problems mentioned above. The apparatus mainly includes a first power generator, a second power generator, a motor and a driver. The motor is electrically connected with the first power generator and receives a first power from the first power generator. The driver is electrically connected between the motor and the second power generator, receives a second power from the second power generator, and drives the motor according to the second power.

By providing the motor and the driver with different powers, the driver is not affected by the first power even though the first power is a pulse power signal thereby reducing or even eliminating the electric noise. Therefore, the design of the motor driving apparatus according to the present invention is novel and unobvious.

Further scope of the applicability of the present invention will become apparent from the detailed description given hereinafter. However, it should be understood that the detailed description and specific examples, while indicating preferred embodiments of the invention, are gven by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 5A:
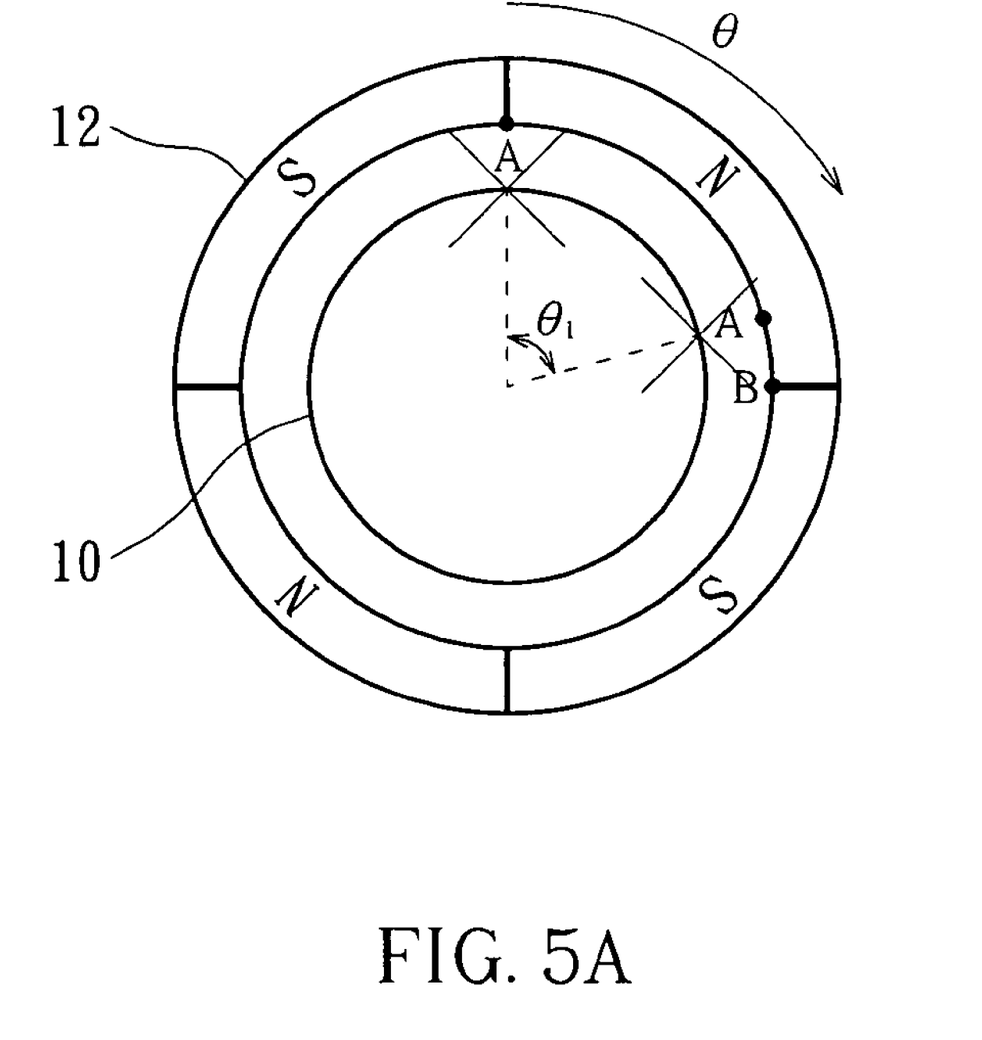
FIG. 5A is a schematic diagram illustrating the angular position of the rotor relative to the stator in a four-pole DC motor.
Figure 5B:
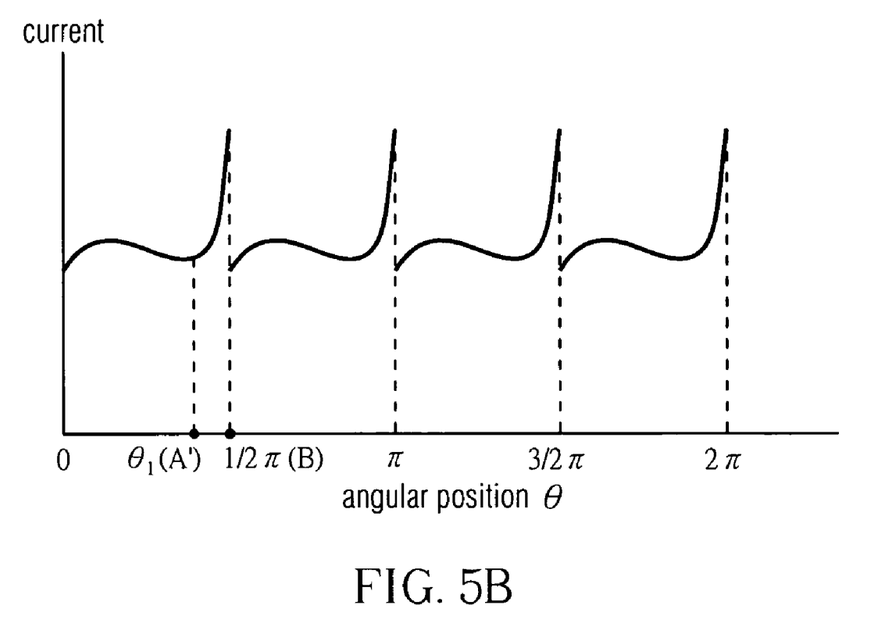
FIG. 5B is a schematic diagram illustrating the current waveform of the four-pole DC motor shown in FIG. 3A during unloaded operations.

FIG. 5A is a schematic diagram illustrating the angular position of the rotor 12 relative to the stator 10 in a four-pole DC motor; FIG. 5B illustrates the current waveform of the four-pole DC motor shown in FIG. 5A during unloaded operations, wherein the horizontal axis shows the clockwise-rotating angle (angular position θ) of the rotor 12.

Comparing the relative angular position of the stator 10 and the rotor 12 in FIG. 5A with the current waveform in FIG. 5B, it can be seen that, for a four-pole motor, the current waveform abruptly changes due to the cogging torque when the rotor 12 rotates to angular positions near $n\pi/2$ (n=1, 2, 3 . . . ). For instance, after the rotor 12 starts to rotate clockwise from point A, the current waveform abruptly changes when the rotor 12 rotates to an angular position between $\theta_1$ (point A') and $\pi/2$ (point B), and the same is true with each of the other $\pi/2$ periods. On the other hand, since the rotor 12 is divided into four magnetic regions alternated between northern and southern polarities, when the rotor 12 rotates, the magnetic flux variation causes back electromotive force (back emf) effect, and the back emf effect in turn make the current waveform vary more dramatically at angular positions near $n\pi/2$ to result in high values of output ripple, vibrations, and noises in the fan motor.

Figure 5C:
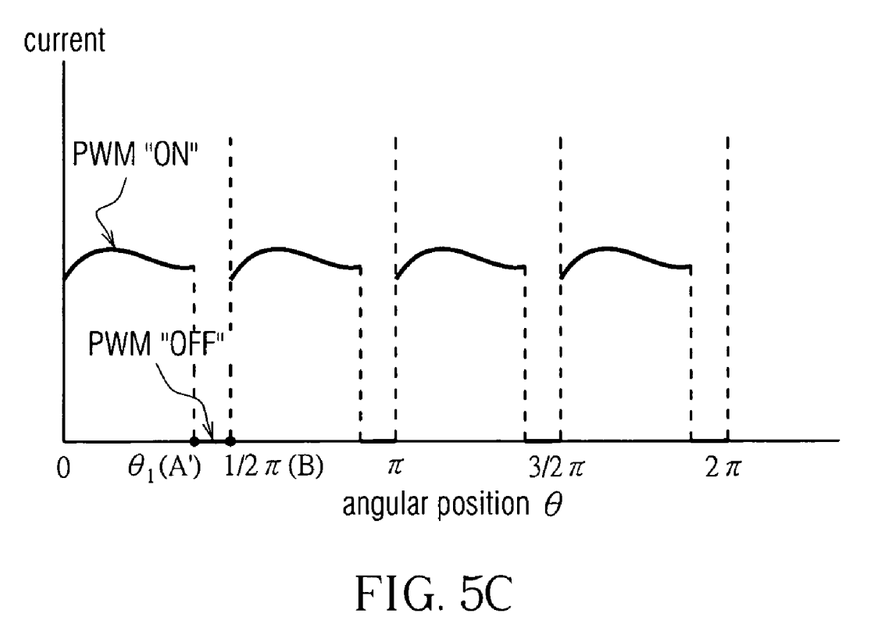
FIG. 5C is a schematic diagram illustrating the smooth current waveform of the four-pole DC motor achieved by the phase control method of the invention.

Therefore, this invention can be characterized in that the on-time and off-time of a pulse width modulation (PWM) control signal are determined in connection with the angular position of the rotor 12. Taking the four-pole motor of FIG. 5A as an example, when the PWM signal is on-time at point A, the rotor 12 starts to rotate due to the electromagnetic force. Then, the PWM signal is switched to off-time at point A' (angular position is $\theta_1$), for the current waveform starts to abruptly change at this time, and is then switched to on-time when the rotor 12 rotates to pass point B ($\theta=\pi/2$), and the same is true with each of the other $\pi/2$ periods. In such manner, the off-time of the PWM control signal is adjusted to synchronize with the acting period of the back emf to eliminate the abrupt changes of the current waveform, as illustrated in FIG. 5C.

Figure 6:
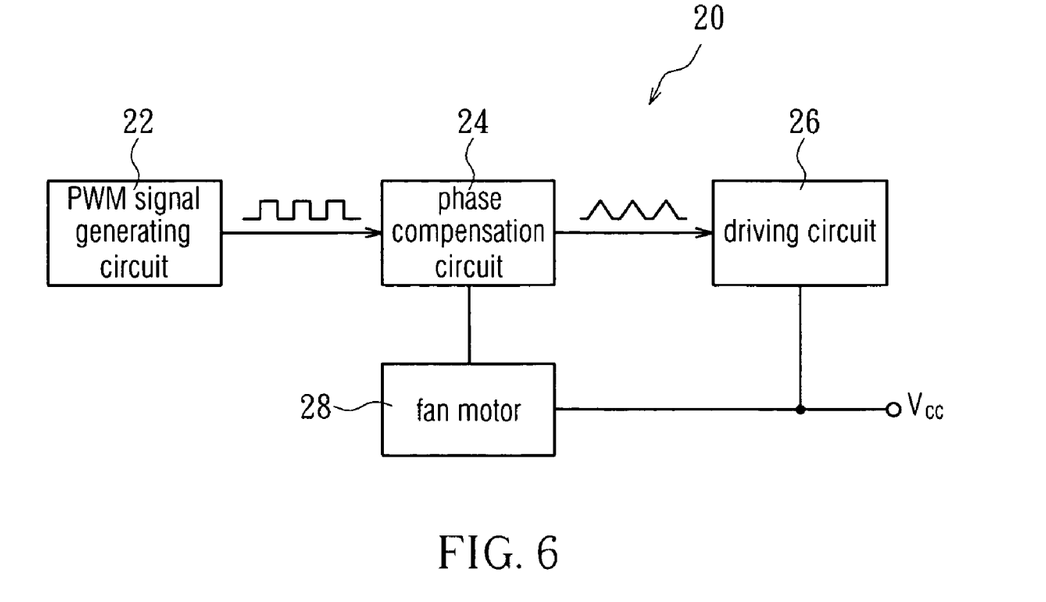
FIG. 6 is a circuit block diagram illustrating an embodiment of the fan speed control circuit of the invention.

FIG. 6 is a circuit block diagram illustrating an embodiment of the invention. Referring to FIG. 6, a fan speed control circuit 20 includes a PWM signal generating circuit 22, a phase compensation circuit 24, and a driving circuit 26. The phase compensation circuit 24 is connected between the PWM signal generating circuit 22 and the driving circuit 26, and an input terminal of a fan motor 28 is independently connected to the phase compensation circuit 24.

The driving circuit 26 outputs a driving signal to the fan motor 28 according to the PWM control signal generated by the PWM signal generating circuit 22. Since the phase compensation circuit 24, coupled between the PWM signal generating circuit 22 and the driving circuit 26, can delay or advance the PWM control signal by a phase angle, the off-time of the PWM control signal can be set to synchronize with the acting period of the back emf formed by the magnetic flux variation. Thus, the abrupt changes of the current waveform are cut off to smooth the rotation of the rotor 12, and the vibrations and noises in the fan motor are considerably reduced as a result.

Figure 7:
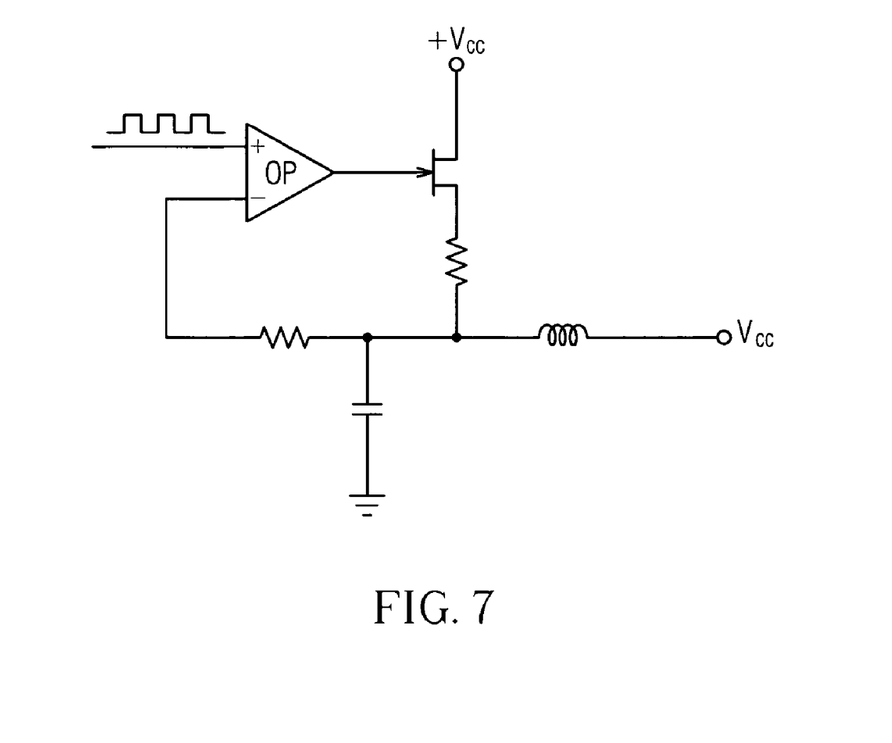
FIG. 7 is a circuit diagram of a phase delay circuit.
Figure 8:
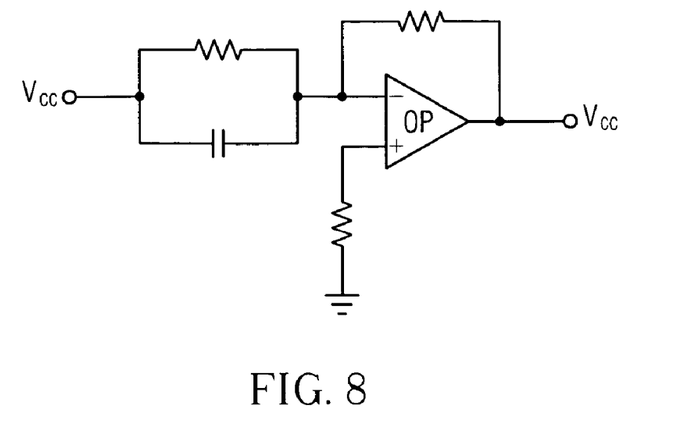
FIG. 8 is a circuit diagram of a phase advance circuit.

FIGS. 7 and 8 show examples of the phase compensation circuit 24 design according to the invention. The phase compensation circuit 24 that consists of operational amplifiers, transistors, resistors, and capacitors may be either a phase delay circuit as illustrated in FIG. 7, or a phase advance circuit as illustrated in FIG. 8. Through the phase compensation circuit 24, a PWM signal can be transformed into a triangular-wave signal, being delayed or advanced by a phase angle, to allow the sequence of alternating on-time and off-time to accurately correspond to the angular position of the rotor 12.

Figure 9:
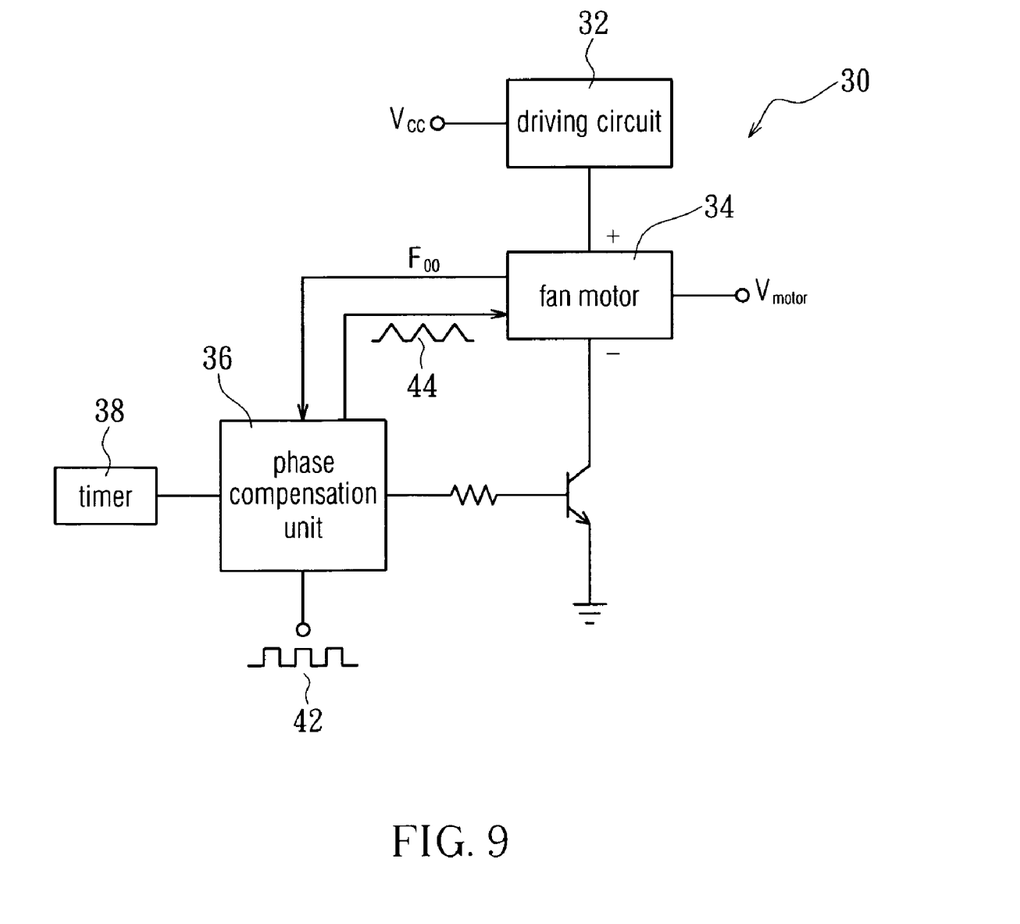
FIG. 9 is a circuit block diagram illustrating another embodiment of the fan speed control circuit of the invention.

FIG. 9 is a circuit block diagram illustrating another embodiment of the invention. The design concept of the invention is not limited to using the aforesaid phase compensation circuit 24 connected between the PWM signal generating circuit 22 and the driving circuit 26. Referring to FIG. 9, the fan motor 34 may independently output a signal indicating the current motor speed to a phase compensation unit 36 via a signal line $F_{00}$, and the phase compensation unit 36 that includes a phase-locked loop, such as a phase delay circuit or a phase advance circuit, may delay or advance the PWM control signal 42 by a phase angle based on the speed signal from the signal line $F_{00}$. Finally, a processed signal 44 is fed back to the fan motor 34 to adjust the sequence of alternating on-time and off-time of the PWM control signal. Further, a timer 38 may be added to precisely calculate the magnitude of the phase angle to be delayed or advanced.

Hence, the way of achieving phase compensating function is not limited as long as the off-time of the PWM control signal is set to synchronize with the acting period of the back emf formed by the magnetic flux variation. For example, the phase compensating function may be incorporated in a driver IC.

The aforesaid four-pole motor is for illustrative purpose only, and the pole number of the fan motor according to the invention is including but not limited to four. For example, if a six-pole motor is used, the current waveform abruptly changes when the rotor 12 rotates to angular positions near $n\pi/3$ (n=1, 2, 3 ...), and one has only to vary the phase angle to be delayed or advanced to synchronize the off-time with the acting period of the back emf.

Further, with regard to the voltage control for the fan speed control circuit 20, it may be achieved either by a single voltage source $V_{cc}$ as illustrated in FIG. 6, or by separate voltage sources $V_{motor}$ and $V_{cc}$ as illustrated in FIG. 9. Specifically, as shown in FIG. 9, the fan motor 34 is electrically connected with a first power generator and receives power $V_{motor}$ generated by the first power generator; the driving circuit 32 is electrically connected between a second power generator and the fan motor 34, receives power Vcc generated by the second power generator, and drives the fan motor 34. In addition, the specific designs employed by the invention to provide the fan motor and the driving circuit with different powers will become apparent from the following detailed description in connection with FIG. 10A and FIG. 10B.

Figure 10A:
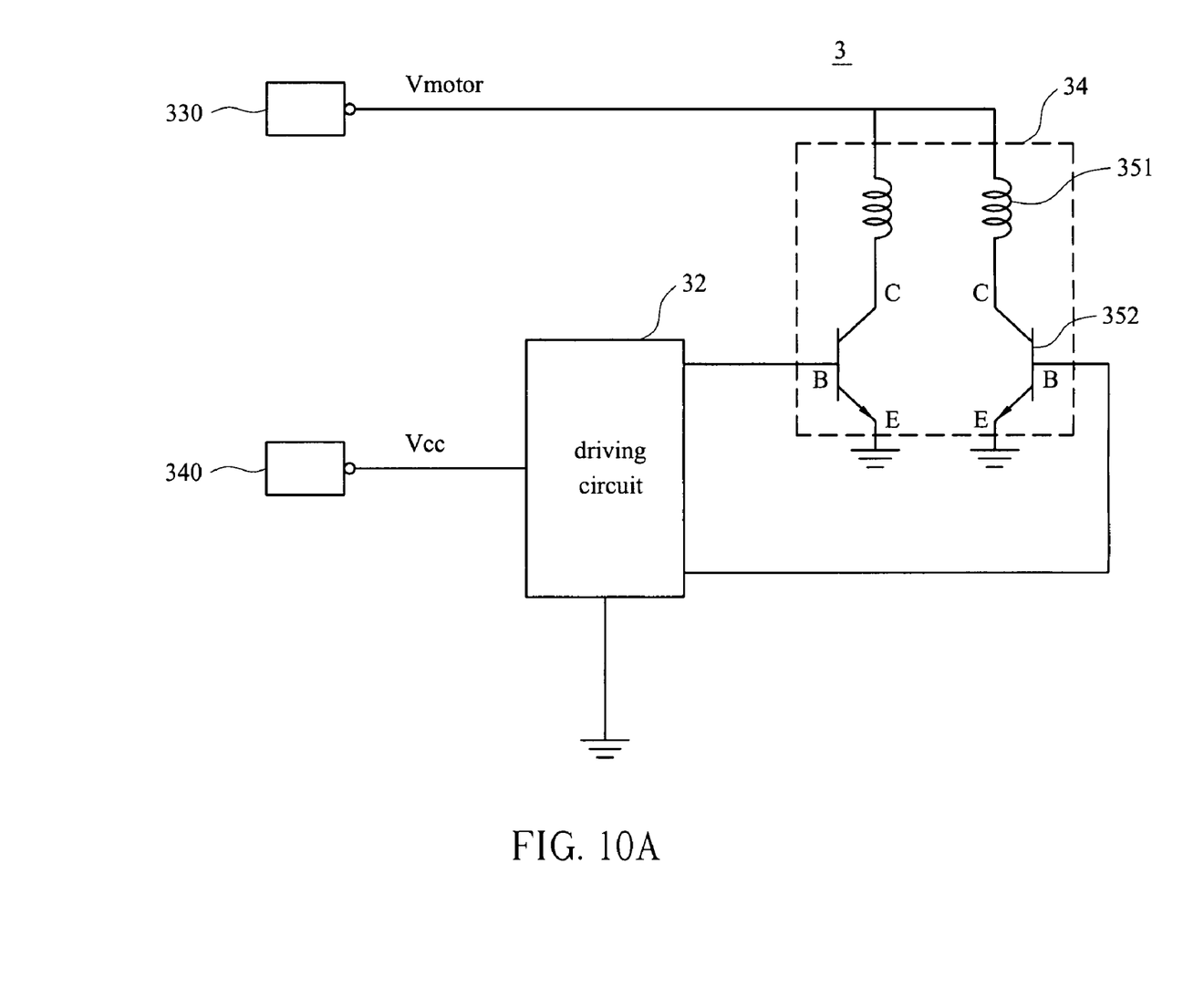
FIG. 10A is a schematic diagram illustrating a bi-power motor driving apparatus according to one embodiment of the present invention.

FIG. 10A shows a bi-power motor driving apparatus 3 of the present invention mainly including a first power generator 330, a second power generator 340, a motor 34 and a driving circuit 32.

The first power generator 330 generates a first power $V_{motor}$ that may be a DC voltage signal or a pulse power signal, wherein the DC voltage signal is an adjustable signal, and the pulse power signal may be embodied as a triangular wave signal or a rectangular wave signal, e.g., a PWM signal.

The second power generator 340 generates a second power Vcc that may be an adjustable DC voltage signal.

The motor 34 is electrically connected with the first power generator 330 and receives the first power $V_{motor}$. In this embodiment, the motor 34 adopts a half-bridge connection, and includes two coils 351 and two switches 352. First ends of the coils 351 are electrically connected with the first power generator 330. Second ends of the coils 351 are electrically connected with corresponding switches 352, respectively. In this embodiment, the switch 352 is embodied as a transistor. The second ends of the coils 351 are electrically connected with the connectors C of the transistors, respectively. The emitters E of the transistors are electrically connected with a ground terminal.

The driving circuit 32 is electrically connected between the second power generator 340 and the motor 34, receives the second power Vcc, and drives the motor 34 according to the second power Vcc. That is, the motor 34 is driven by receiving the first power $V_{motor}$ and the second power Vcc transmitted from the driving circuit 32. In this embodiment, the driving circuit 32 may be embodied as a microprocessor that can generate several driving signals SDRI fed to the base B of the switches 352 for performing on/off control of the switches 352. When the coils 351 receive the first power $V_{motor}$ such that an electric current flows therethrough, and the switches 352 are turned on, the coils 351, are activated to cause the motor 34 to rotate.

By providing the motor 34 and the driving circuit 32 with different powers, the driving circuit 32 is not affected by the first power $V_{motor}$ even though the first power $V_{motor}$ is a pulse power signal such that the motor driving apparatus of the present invention generates no electric noise, and therefore is suitable for use in a quiet environment.

Figure 10B:
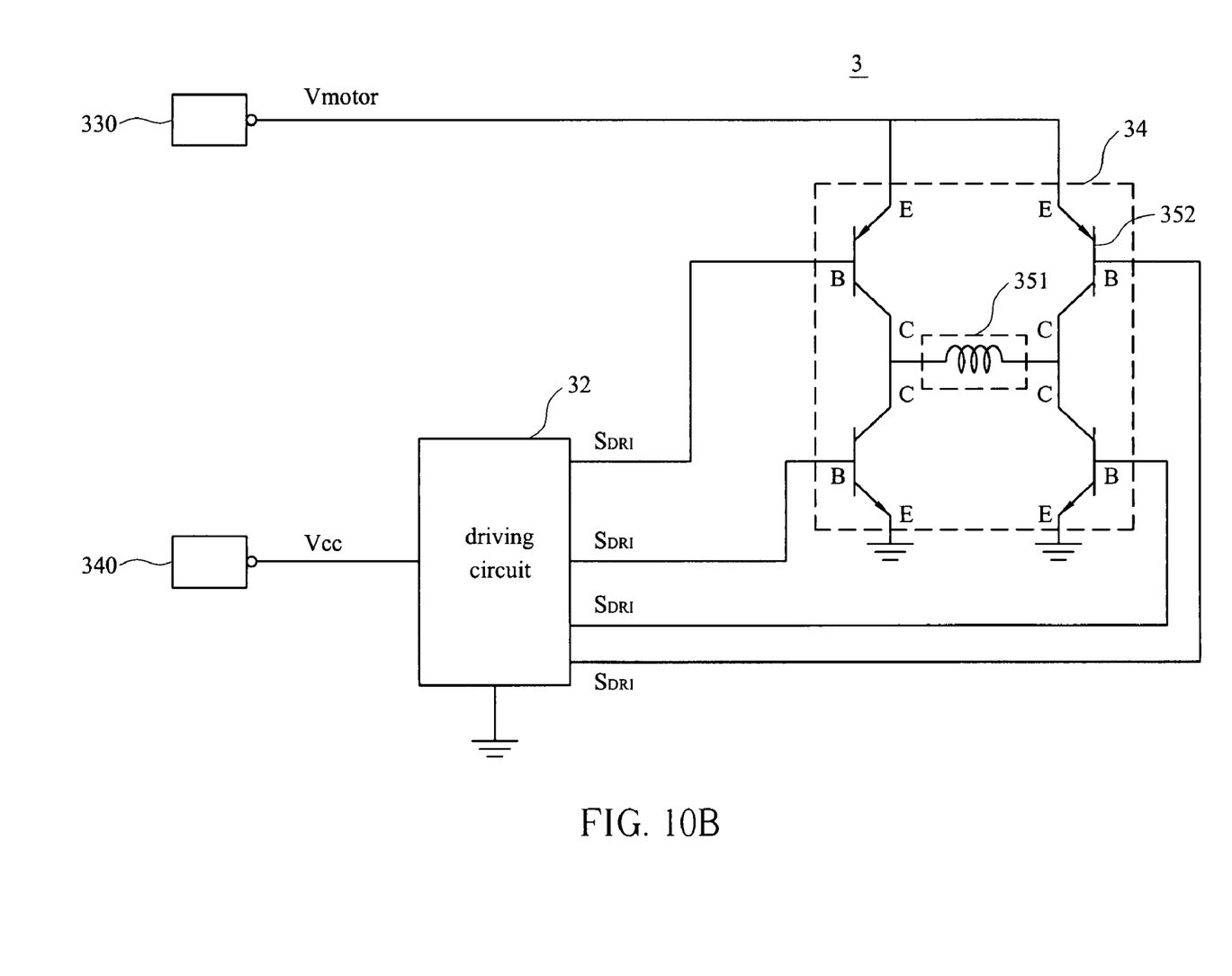
FIG. 10B is a schematic diagram illustrating a bi-power motor driving apparatus according to another embodiment of the present invention.

FIG. 10B shows another embodiment of the present invention which is substantially identical to the embodiment of FIG. 10A except that the motor 34 adopts a full-bridge connection, and includes a coil 351 and a plurality of switches 352 (four are illustrated in FIG. 10B), wherein the switch 352 is also embodied as a transistor, the coil 351 is electrically connected with the collector C of the transistors, the base B of the transistors are electrically connected with the driving circuit 32 for receiving the driving signal $S_{DRI}$, the emitters E of two of the transistors are electrically connected with the first power 330, and the emitters E of another two of the transistors are electrically connected with the ground terminal. In this embodiment, the driving signal $S_{DRI}$ can control alternate on-off actions of the transistors to change the direction of electric current flowing through the coil 351 thereby driving the motor 34 to rotate.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A bi-power motor driving apparatus, comprising:
a first power generator for generating a first power;
a second power generator for generating a second power;
a motor electrically connected with the first power generator; and
a driving circuit electrically connected between the motor and the second power generator for receiving the second power;
wherein the motor is driven by receiving the first power and to second power transmitted from the driving circuit.

2. The bi-power motor driving apparatus as recited in claim 1, wherein each of the first power and the second power is a DC voltage signal.

3. The bi-power motor driving apparatus as recited in claim 1, wherein the first power is a pulse power signal, a triangular wave signal or a rectangular wave signal.

4. The bi-power motor driving apparatus as recited in claim 1, wherein the first power is a PWM signal.

5. The bi-power motor driving apparatus as recited in claim 1, wherein the second power is an adjustable DC voltage signal.

6. The bi-power motor driving apparatus as recited in claim 1, wherein the motor includes a plurality of coils and a plurality of switches electrically connected between the coils and the driving circuit to form a half-bridge connection.

7. The bi-power motor driving apparatus as recited in claim 6, wherein the switches are transistors.

8. The bi-power motor driving apparatus as recited in claim 7, wherein each of the transistors has a collector electrically connected with the coil, a base electrically connected with the driving circuit, and an emitter electrically connected with a ground terminal.

9. The bi-power motor driving apparatus as recited in claim 1, wherein the motor includes a coil and a plurality of switches electrically connected between the coil and the driving circuit to form a full-bridge connection.

10. The bi-power motor driving apparatus as recited in claim 9, wherein the switches are transistors.

11. The bi-power motor driving apparatus as recited in claim 10, wherein each of the transistors has a collector electrically connected with the coil and a base electrically connected with the driving circuit, two of the transistors respectively have an emitter electrically connected with the first power generator; and another two of the transistors respectively have an emitter electrically connected with a ground terminal.

12. The bi-power motor driving apparatus as recited in claim 1, wherein the driving circuit is a microprocessor.

13. A fan speed control circuit, comprising:
a pulse width modulation (PWM) signal generating circuit for generating a PWM control signal with a sequence of alternating on-time and off-time;
a driving circuit for outputting a driving signal according to the PWM control signal to a fan motor;
a phase compensation unit connected to the fan motor for delaying or advancing the PWM control signal by a phase angle to synchronize the acting period of the back electromotive force formed by the magnetic flux variation with the off-time of the PWM control signal;
a first power generator, electrically connected with the fan motor; and
a second power generator, wherein the driving circuit is electrically connected between the motor and the second power generator, the fan motor is driven by receiving the first power generator and the second power transmitted from the driving circuit.

14. A fan speed control circuit, comprising:
a PWM signal generating circuit for generating a PWM control signal with a sequence of alternating on-time and off-time;
a driving circuit for outputting a driving signal according to the PWM control signal to a fan motor;
a phase compensation circuit connected between the PWM signal generating circuit and the driving circuit, wherein the phase compensation circuit is connected to a fan motor for delaying or advancing the PWM control signal by a phase angle to synchronize the acting period of the back electromotive force formed by the magnetic flux variation with the off-time of the PWM control signal;
a first power generator, electrically connected with the fan motor; and
a second power generator, wherein the driving circuit is electrically connected between the motor and the second power generator, the fan motor is driven by receiving the first power generator and the second power transmitted from the driving circuit.

* * * * *